United States Patent
Watson

(10) Patent No.: US 11,540,487 B2
(45) Date of Patent: Jan. 3, 2023

(54) FRONT-FACING PET CARRYING BACKPACK AND CONVERTIBLE PET PEN

(71) Applicant: K9 Sport Sack, LLC, Lehi, UT (US)

(72) Inventor: Joseph Watson, Orem, UT (US)

(73) Assignee: K9 Sport Sack, LLC, Lehi, UT (US)

( * ) Notice: Subject to any disclaimer, the term of this patent is extended or adjusted under 35 U.S.C. 154(b) by 0 days.

(21) Appl. No.: 17/008,479

(22) Filed: Aug. 31, 2020

(65) Prior Publication Data

US 2022/0061262 A1    Mar. 3, 2022

(51) Int. Cl.
*A01K 1/02* (2006.01)
*A01K 27/00* (2006.01)

(52) U.S. Cl.
CPC ............ *A01K 1/029* (2013.01); *A01K 1/0245* (2013.01); *A01K 1/0254* (2013.01); *A01K 1/0263* (2013.01); *A01K 27/002* (2013.01); *A01K 27/008* (2013.01)

(58) Field of Classification Search
CPC ...................................................... A01K 1/029
See application file for complete search history.

(56) References Cited

U.S. PATENT DOCUMENTS

| | | |
|---|---|---|
| D57,526 S | 4/1921 | Hunt |
| D111,138 S | 9/1938 | Firle |
| D132,469 S | 5/1942 | Murphy |
| 3,019,952 A | 2/1962 | Brewster |
| 4,018,369 A | 4/1977 | Jaeger |
| 4,318,502 A | 3/1982 | Lowe |
| 4,941,603 A | 7/1990 | Creamer et al. |
| D331,660 S | 12/1992 | Souhrada et al. |
| 5,176,102 A | 1/1993 | Tracy |
| D333,565 S | 3/1993 | Imbert |
| D334,253 S * | 3/1993 | Balzarini ...................... D3/214 |
| D340,354 S | 10/1993 | Wrath |

(Continued)

FOREIGN PATENT DOCUMENTS

| | | |
|---|---|---|
| CN | 201005216 | 1/2008 |
| CN | 202535860 | 11/2012 |

(Continued)

OTHER PUBLICATIONS

International Search Report dated Mar. 12, 2018, in corresponding Application No. PCT/US2017/063130.

(Continued)

*Primary Examiner* — Jessica B Wong
(74) *Attorney, Agent, or Firm* — Thorpe North & Western, LLP

(57) ABSTRACT

A pet carrying backpack includes a bottom panel, a front panel, a rear panel, a right-side panel, and a left-side panel connected to form a bag with an open top. The open top includes a collar forming an opening which allows a head of an animal within the bag to protrude therefrom. The collar may be adjustable. Shoulder straps are disposed on and extend from the front panel. Paw holes are disposed on a front of the backpack body above the shoulder straps and below the collar. The paw holes are configured to accommodate paws or legs of the animal. A pet carrying platform is disposed within the bag above the bottom panel and below the open top. The pet carrying platform forms a storage compartment below the pet carrying platform and a pet compartment above the pet carrying platform.

10 Claims, 12 Drawing Sheets

(56) References Cited

U.S. PATENT DOCUMENTS

| | | | |
|---|---|---|---|
| 5,419,281 A * | 5/1995 | Williams | A47D 13/025 |
| | | | 224/159 |
| D370,090 S | 5/1996 | Coggins | |
| D383,305 S | 9/1997 | Holstrom | |
| D392,798 S | 3/1998 | Gelb | |
| 5,964,470 A | 10/1999 | Syendsen et al. | |
| 6,481,606 B2 | 11/2002 | Pickett | |
| 6,701,871 B1 * | 3/2004 | Johnson | A01K 1/0254 |
| | | | 119/500 |
| D553,350 S | 10/2007 | Dvorak | |
| D554,853 S | 11/2007 | Bihn | |
| D615,757 S | 5/2010 | Kostner | |
| D616,611 S | 5/2010 | Lu | |
| D650,576 S | 12/2011 | Bertken | |
| D664,765 S | 8/2012 | Saia | |
| D683,537 S | 6/2013 | Bandru | |
| D692,654 S | 11/2013 | Irwin et al. | |
| D710,085 S | 8/2014 | Szewczyk | |
| D734,942 S | 7/2015 | Robinson et al. | |
| D737,046 S | 8/2015 | Robert | |
| D737,568 S | 9/2015 | Robert | |
| D739,653 S | 9/2015 | Majeau | |
| D745,777 S | 12/2015 | Zwetzig et al. | |
| D758,715 S | 6/2016 | Daniel et al. | |
| D771,947 S | 11/2016 | Tong | |
| D778,051 S | 2/2017 | Johnson | |
| D778,595 S | 2/2017 | Zurowski | |
| D779,823 S | 2/2017 | Barenbrug | |
| D780,454 S | 3/2017 | Zwetzig et al. | |
| D784,685 S | 4/2017 | Newson | |
| D787,815 S | 5/2017 | Davison | |
| D796,187 S | 9/2017 | Bogue | |
| D818,262 S | 5/2018 | Schofield | |
| D819,328 S | 6/2018 | Muhlenkamp et al. | |
| D822,378 S | 7/2018 | Franek | |
| D824,660 S | 8/2018 | Ross | |
| D828,112 S | 9/2018 | Furneaux et al. | |
| D829,435 S | 10/2018 | Viger et al. | |
| D849,399 S | 5/2019 | Christophe | |
| D852,492 S | 7/2019 | Anderson | |
| D858,977 S | 9/2019 | Owens | |
| D876,081 S | 2/2020 | Dumas | |
| D876,826 S | 3/2020 | Watson | |
| 10,617,096 B2 * | 4/2020 | Watson | A01K 1/0254 |
| D890,515 S | 7/2020 | Oviedo Polanco | |
| 10,799,003 B2 | 10/2020 | Bradley et al. | |
| D904,756 S | 12/2020 | Lu | |
| D908,975 S | 1/2021 | Watson | |
| D909,049 S | 2/2021 | Watson | |
| D910,243 S | 2/2021 | Watson | |
| D915,762 S * | 4/2021 | Li | D3/217 |
| D924,559 S | 7/2021 | Li | |
| D931,600 S | 9/2021 | Huang | |
| D942,142 S * | 2/2022 | Mandos | D3/217 |
| 2002/0074372 A1 | 6/2002 | Pickett | |
| 2002/0108982 A1 | 8/2002 | Mydans | |
| 2003/0205601 A1 | 11/2003 | Kilduff | |
| 2007/0017947 A1 | 1/2007 | Fenton | |
| 2008/0066689 A1 | 3/2008 | Martz | |
| 2008/0149673 A1 | 6/2008 | Slater | |
| 2008/0156275 A1 | 7/2008 | Lam | |
| 2008/0216764 A1 | 9/2008 | Porter | |
| 2011/0083933 A1 | 4/2011 | Engel | |
| 2013/0221051 A1 | 8/2013 | Hairston et al. | |
| 2014/0060453 A1 | 3/2014 | Shewfelt | |
| 2017/0172102 A1 * | 6/2017 | Rivera | A45F 3/04 |
| 2018/0139921 A1 | 5/2018 | Kath | |
| 2018/0139922 A1 | 5/2018 | Watson | |
| 2018/0154203 A1 | 6/2018 | Schromm | |
| 2018/0228120 A1 | 8/2018 | Laicheng | |
| 2020/0060222 A1 | 2/2020 | Watson | |
| 2022/0061263 A1 * | 3/2022 | Watson | A01K 1/0263 |

FOREIGN PATENT DOCUMENTS

| | | |
|---|---|---|
| CN | 303221063 | 5/2015 |
| CN | 303342928 | 8/2015 |
| CN | 304021795 | 2/2017 |
| CN | 206150107 U | 5/2017 |
| CN | 305122160 | 4/2019 |
| CN | 209268299 U | 8/2019 |
| CN | 306365217 | 3/2021 |
| EP | 000042999-0004 | 6/2003 |
| EP | 006395372-0001 | 4/2019 |
| EP | 006395372-0002 | 4/2019 |
| GB | 6016752 | 8/2017 |
| GB | 9006395372-0002 | 4/2019 |
| GB | 6128720 | 4/2021 |
| JP | 05-046264 | 6/1993 |
| JP | 2000-287574 | 10/2000 |
| JP | 3167159 U | 4/2011 |
| JP | D1609184 | 7/2018 |
| JP | D1621362 | 1/2019 |
| KR | 20-0335245 | 12/2003 |
| KR | 10-1525981 | 6/2015 |
| KR | 300823841.0000 | 11/2015 |
| KR | 10-2019-0056722 A | 5/2019 |
| KR | 301136355.0000 | 11/2021 |
| RU | 00084313 | 2/2013 |
| RU | 00127653 | 9/2021 |
| SG | 20141329 | 12/2014 |
| TW | D180162 | 12/2016 |
| TW | D182034 | 4/2018 |
| TW | D190435 | 5/2018 |
| TW | D194326 | 12/2018 |
| WO | WO 97/37529 A1 | 10/1997 |
| WO | WO 2008/153252 | 12/2008 |
| WO | W0-2016096150 A1 | 6/2016 |

OTHER PUBLICATIONS

K9 Sport Sack: Because Dogs Just Wanna to Have Fun! posted at missmollysays.com, posted on Feb. 26, 2017, online, URL:https://missmol lysays .com/k9-sport-sack-because-dogs-iust-wanna-have-fun/ (Year: 2017).

K9 Sport Sack, posted at www.bonesps.com, no posting date available, online, URL:https://www.bonesps.com/collections/vendors?q=K9%20Sport%20Sack (Year: 2018).

JPO Ref. No. HB08021181, Outside, 9th, vol. 21, p. 150, Sep. 30, 1996, 1 page.

JPO Ref. No. HH13021686, S Design Gazette (DE), Nov. 10, 2000, 1 page.

JPO Ref. No. HA13021582, Tokusengai, 1st, vol. 24, p. 175, Jan. 1, 2002, 1 page.

JPO Ref. No. HC14042642, General Catalog, E-Motion, p. 28, JPO documented on Sep. 27, 2002, 1 page.

JPO Ref. No. HC15040837, Adventure Travel, The North Face Catalog Fall & Winter 2003-2004, p. 53, JPO documented on Oct. 24, 2003, 1 page.

JPO Notification of List of References for JP Design Registration Application No. 2018-020511.

International Search Report dated Dec. 4, 2019, in corresponding Application No. PCT/US2019/047562.

Amazon, "K9 Sport Sack 1 Dog Carrier Backpack for Small and Medium Pets . . . ", First review Jan. 4, 2016. (https://www.arnazon.coM/dp/B07HZ6BVQ4?th=1) (Year: 2016).

Extended European Search Report dated Jun. 17, 2020 in corresponding Application No. EP7874238.3.

International Search Report for International Application No. PCT/US2021/048299 dated Nov. 29, 2021, 10 pages.

Ytonet Pet Carrier Backpack, available at amazon.com, earliest date available Nov. 30, 2018 [online], site visited Dec. 9, 2021, Available from the internet URL: https://www.amazon.com/dp/B07FY4561Q?th=1 (Year: 2018).

K9 Sport Sack Evolution, available at youtube.com, posted May 22, 2020 [online], site visited Dec. 9, 2021, Available from the internet URL: https://www.youtube.com/watch?v=zGWK70RMVQM (Year: 2020).

(56) References Cited

OTHER PUBLICATIONS

Backpack, walmart.com, date not available [online], site visited Dec. 9, 2021, Available from the internet URL: https://www.walmart.com/ip/Anself-Pet-Backpack-Dog-Cat-Carrier-Double-Zip-Clear-Window-Side-Pockets-Travel-Shoulder-Bag-Open-Doors-Comfortable-Travelling-Hiking-Outdoor-Use/397323749.
K9 Sport Sack Air 2, available at k9sportsack.com, earliest customer review date Feb. 24, 2020 [online], site visited Dec. 9, 2021, Available from the internet URL: https://www.k9sportsack.com/products/air-2 (Year: 2020).
K9 Sport Sack Post, available at facebook.com, posted Sep. 3, 2019 [online], site visited Dec. 9, 2021, Available from the internet URL: https://www .facebook.com/k9sportsackusa/photos/a.1908221172781963/2427074830896592/?type=3 (Year: 2019).
K9 Sport Sack Post, available at facebook.com, posted Mar. 1, 2020 [online], site visited Dec. 9, 2021, Available from the internet URL: https://www.facebook.com/k9sportsackusa/photos/a.1908221172781963/2585534958383911/?type=3 (Year: 2020).
Pets Carrier Backpack, available at nxills.com, date not available [online], site visited Dec. 9, 2021, Available from the internet URL: https://www.nxills.com/index.php?main_page=product_info&products_id=794974.
K9 Sport Sack Post, available at facebook.com, posted Jun. 1, 2018 [online], site visited Dec. 9, 2021, Available from the internet URL: https://www.facebook.eom/k9sportsackusa/photos/a.1606811192922964/2095610264043052/7type=3 (Year: 2018).
WOYYHO Pet Dog Carrier Backpack, available at amazon.com, earliest date available Oct. 17, 2020 [online], site visited Dec. 9, 2021, Available from the internet URL: https://www.amazon.com/dp/B08L7RFYXG?tag=upgrapoint-20&linkCode=ogi&th=1 (Year: 2020).
Kurgo G-Train Backpack, available at chewy.com, earliest customer review date May 14, 2019 [online], site visited Dec. 9, 2021, Available from the internet URL: https://www.chewy.com/kurgo-g-train-airline-approved-dog/dp/190589? (Year: 2019).
Herkey the Cavalier's K9 Sport Sack Adventure 2019, available at youtube.com, posted Apr. 25, 2019 [online], site visited Dec. 9, 2021, Available from the internet URL: https://www.youtube.com/watch?v=wxGILs-DsiE (Year: 2019).
K9 Sport Sack Trainer, available at amazon.com, earliest customer question date Dec. 1, 2019 [online], site visited Dec. 9, 2021, Available from the internet URL: https://www.amazon.com/K9-Sport-Sack-Adjustable-Veterinarian/dp/B07XYK9N3G?th=1 (Year: 2019).
PawRoll Dog Carrier Backpack, available at pawroll.com, earliest customer review date Jan. 26, 2018 [online], site visited Dec. 9, 2021, Available from the internet URL: https://pawroll.com/products/pawroll-dog-backpack-carrier? (Year: 2018).
K9 Sport Sack Trainer, available at k9sportsack.com, earliest customer review date Jan. 2, 2020 [online], site visited Dec. 9, 2021, Available from the internet URL: https://www.k9sportsack.com/products/k9-sport-sack-trainer (Year: 2020).
Outward Hound Carrier, available at amazon.com, earliest date available Apr. 30, 2012 [online], site visited Dec. 9, 2021, Available from the internet URL: https://www.amazon.com/Outward-Hound-Pooch-Pouch-Carrier-Backpack/dp/B0081XIJ9M? (Year: 2012).
K9 Sport Sack Air Trainer, available at petco.com, date not available [online], site visited Dec. 9, 2021, Available from the internet URL: https ://www.petco.com/shop/en/petcostore/product/k9-sport-sack-air-trainer-green-backpack-pet-carrier-12-1-x-11-w-x-22-h-3161467?.
K9 Sport Sack: Unique Dog Transportation Bag, available at www.kickstarter.com, posted Apr. 26, 2013 [online], available from the Internet URL: https://www.kickstarter.com/projects/1034052737/k9-sport-sack-unique-dog-transportation-bag?ref=discovery&term=k9%20sport%20sack.
Ruffit Dog Carrier, available at amazon.com, earliest customer review Dec. 12, 2017 [online], site visited Apr. 20, 2022.
K9 Sport Sack Knavigate, available at k9sportsack.com, earliest customer review date Dec. 15, 2020 [online], site visited Dec. 9, 2021, Available from the internet URL: https://www.k9sportsack.com/products/k9-sport-sack-knavigate (Year: 2020).
K9 Sport Sack Post, available at facebook.com, posted Dec. 29, 2018 [online], site visited Dec. 9, 2021, Available from the internet URL: https://www .facebook.com/k9sportsackusa/photos/a.1908221172781963/2262498034020940/?type=3 (Year: 2018).
The All New Knavigate, available at youtube.com, posted Dec. 1, 2020 [online], site visited Dec. 9, 2021, Available from the internet URL: https://www.youtube.com/watch?v=hfKOryG2z4o (Year: 2020).
Tirrinia Large Pet Backpack, available at amazon.com, earliest date available Nov. 30, 2018 [online], site visited Dec. 9, 2021, Available from the internet URL: https://www.amazon.com/gp/product/B0797DGZ38/?th= 1 (Year: 2018).
WLDOCA Dog Carrier Backpack, available at amazon.com, earliest date available Mar. 14, 2019 [online], site visited Dec. 9, 2021, Available from the internet URL: https://www.amazon.com/WLDOCA-Carrier-Backpack-Adjustable-Motorcycle/dp/B08KVXPTHR?th=1 (Year: 2019).
International Search Report for International Application No. PCT/US2022/012588 dated Apr. 22, 2022, 12 pages.
Extended European Search Report dated Apr. 7, 2022; in EP Application No. 19851294.9 filed Aug. 21, 2019; 9 pages.

* cited by examiner

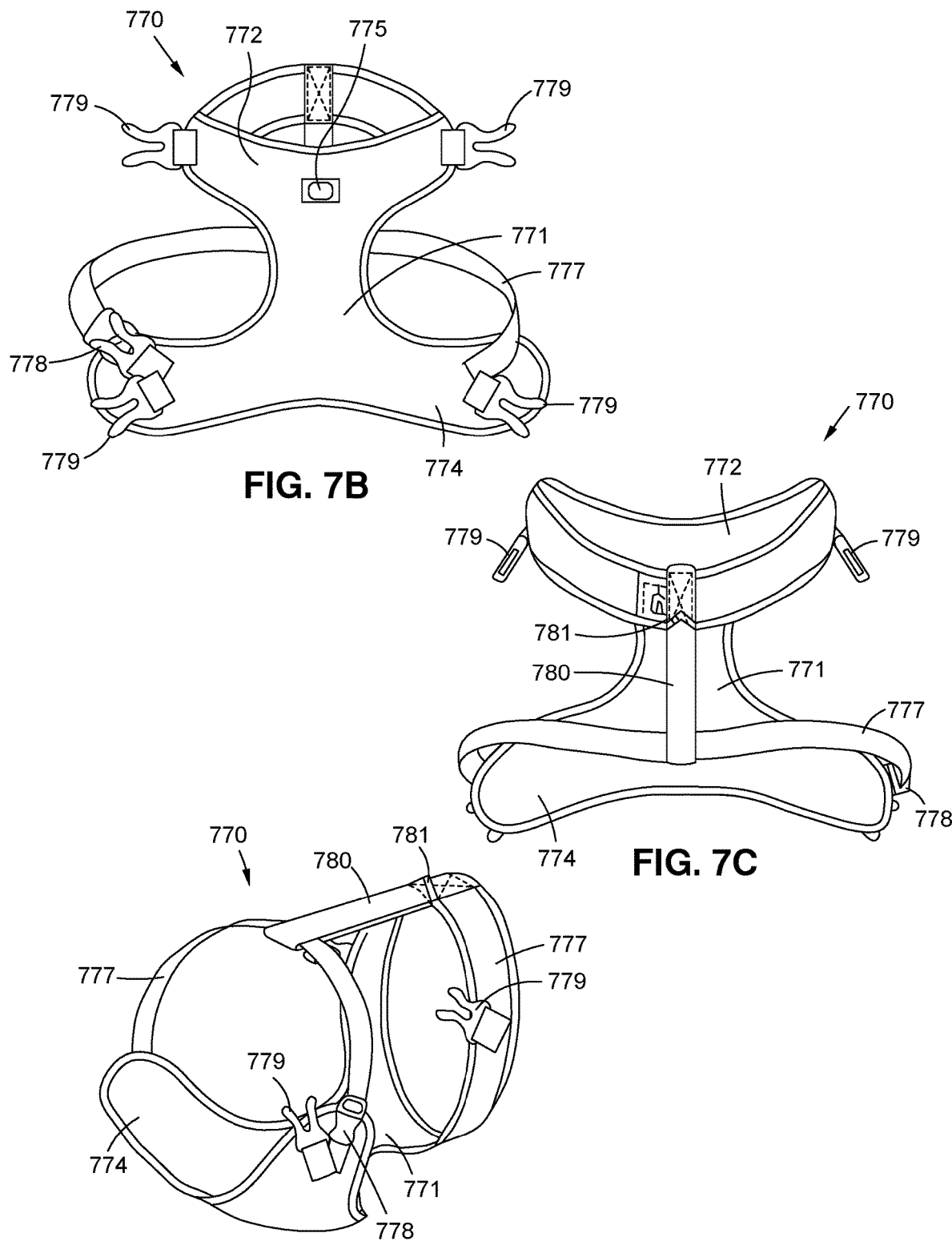

FRONT-FACING PET CARRYING BACKPACK AND CONVERTIBLE PET PEN

BACKGROUND

Many people enjoy keeping pets for the companionship, help, and/or friendship that they provide. Pets, of course, require substantial time and care from their owners to ensure that they are well cared for. Sometimes, pet owners would like to travel, hike, or participate other activities which their pets are not capable of due to the pet's size, age, or various health issues. Many pet owners also prefer not to leave their pets in the care of friends or commercial pet care facilities while participating in such activities. Accordingly, such pet owners are need of a solution that allows them to participate in activities they find enjoyable while being able to bring along their pet companions that may not otherwise be capable of joining with them.

SUMMARY

According to one exemplary embodiment, a pet carrying backpack includes a bottom panel, a front panel, a rear panel, a right-side panel, and a left-side panel connected together to form a bag with an open top. The open top includes a collar forming an opening which is configured to allow a head of an animal disposed within the bag to protrude therefrom. The collar may be adjustable to facilitate animals of different sizes, and to allow for easy loading and unloading of the animal.

The pet carrying backpack may further include shoulder straps disposed on and extending from the front panel, and paw holes disposed on a front of the backpack body above the shoulder straps and below the collar. The paw holes may accommodate paws or legs of the animal. A pet carrying platform may be disposed within the bag above the bottom panel and below the open top. The pet carrying platform may thus form a storage compartment below the pet carrying platform and a pet compartment above the pet carrying platform within the bag.

In another exemplary embodiment, the pet carrying backpack may include at least one contouring strap that is configured to shape the bag. A vertical zipper may be disposed in the back panel. The zipper facilitates ingress and egress to and from the pet compartment. The contouring strap(s) may include at least one lumbar support strap that is disposed on the backpack to cross over the vertical zipper. The lumbar support strap(s) may extend across the rear panel and attach to the backpack at seams between the rear panel and the side panels.

In an exemplary embodiment, the at least one contouring strap includes at least one adjustment strap disposed over at least one of the right-side panel and the left-side panel. The at least one adjustment strap may be oriented diagonally relative to a seam between the front panel and the right-side panel and/or the left-side panel. An angle of the diagonal orientation of the at least one adjustment strap may be between 25 degrees and 65 degrees.

In some embodiments, the pet carrying platform may be angled upwards from the front panel towards the rear panel. The angle of the pet carrying platform relative to a direction perpendicular to the front panel may be between 10 and 30 degrees.

In some embodiments, the pet carrying backpack includes waist straps. The waist straps may be connected to the bag adjacent to the storage compartment.

In some embodiments, there may be a set of pet carrying backpack where a first pet carrying platform of a first pet carrying backpack of the set is disposed at a first distance from a first bottom panel of the first pet carrying backpack and a second pet carrying platform of a second pet carrying backpack of the set is disposed at a second distance from a second bottom panel of the second pet carrying backpack, the second distance being greater than the first distance.

In another exemplary embodiment, a pet carrying backpack includes a bottom panel, a front panel, a rear panel, a right-side panel, and a left-side panel connected together to form a bag with an open top. The open top includes a collar forming an opening which is configured to allow a head of an animal disposed within the bag to protrude therefrom. The collar may be adjustable.

The backpack further includes shoulder straps disposed on and extending from the front panel, and paw holes disposed on a front of the backpack body above the shoulder straps and below the collar. The paw holes accommodate paws or legs of the animal. A harness may also be included and is configured to be worn by the animal and to be removably connectable to the bag.

The harness may include a chest portion where the chest portion has an attachment mechanism. The attachment mechanism may be configured to attach to and detach from the front panel of the bag. In some instances, the attachment mechanism attaches to the front panel of the bag between the paw holes. The harness may also include storage bag clips configured to receive a storage bag to be worn by the animal.

In some embodiments, an l-shaped access zipper may be disposed on the back panel. The l-shaped access zipper provides ingress to and egress from the bag.

In another exemplary embodiment, a pet carrying backpack includes a bottom panel, a front panel, a rear panel, a right-side panel, and a left-side panel connected together to form a bag with an open top. The open top includes a collar forming an opening which is configured to allow a head of an animal disposed within the bag to protrude therefrom. The collar may be adjustable. Shoulder straps may be disposed on and extending from the front panel, and paw holes may be disposed on a front of the backpack body above the shoulder straps and below the collar. The paw holes accommodate paws or legs of the animal.

The backpack may further include at least one pet pen portion disposed on one of the front panel and the rear panel. The pet pen portion is deployable to extend from a stored position to a deployed position to form at least a part of a pet pen.

The at least one pet pen portion may include a front pen portion disposed on the front panel and a rear pen portion disposed on the rear panel. The front pen portion may have a front pen release zipper which when unfastened allows the front pen portion to be deployed from the stored position to the deployed position, and the rear pen portion includes a rear pen release zipper which when unfastened allows the rear pen portion to be deployed from the stored position to the deployed position.

The rear panel may include at least one access zipper. The at least one access zipper may be disposed between the rear pen release zipper and a seam between the rear panel and at least one of the right-side panel and the left-side panel.

The at least one pet pen portion may include a mesh material allowing ventilation and visibility for the pet pen. The backpack may further include a base padding that has a bottom portion disposed in or adjacent to the bottom panel and at least one side portion being disposed in the at least one pet pen portion. The at least one side portion providing padding adjacent to the bottom portion when the at least one pet pen portion is in the deployed position.

BRIEF DESCRIPTION OF THE DRAWINGS

FIGS. 7B, 7C, and 7D show another exemplary embodiment of a harness compatible with a pet carrying backpack.

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Front Facing, Pet Carrying Backpacks

Figure 1:
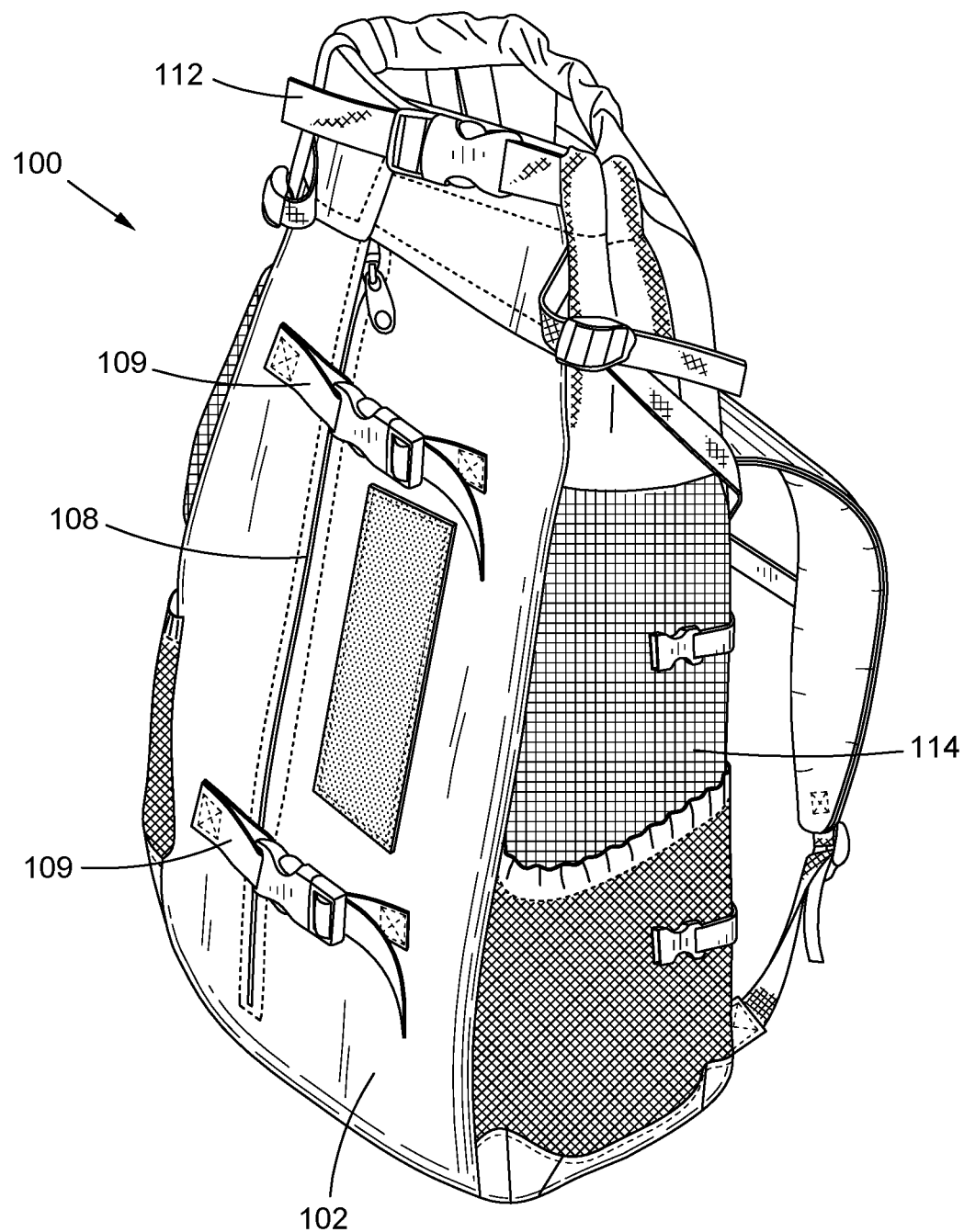
FIG. 1 shows a front perspective view of a front facing, pet carrying backpack according to an exemplary embodiment.
Figure 2:
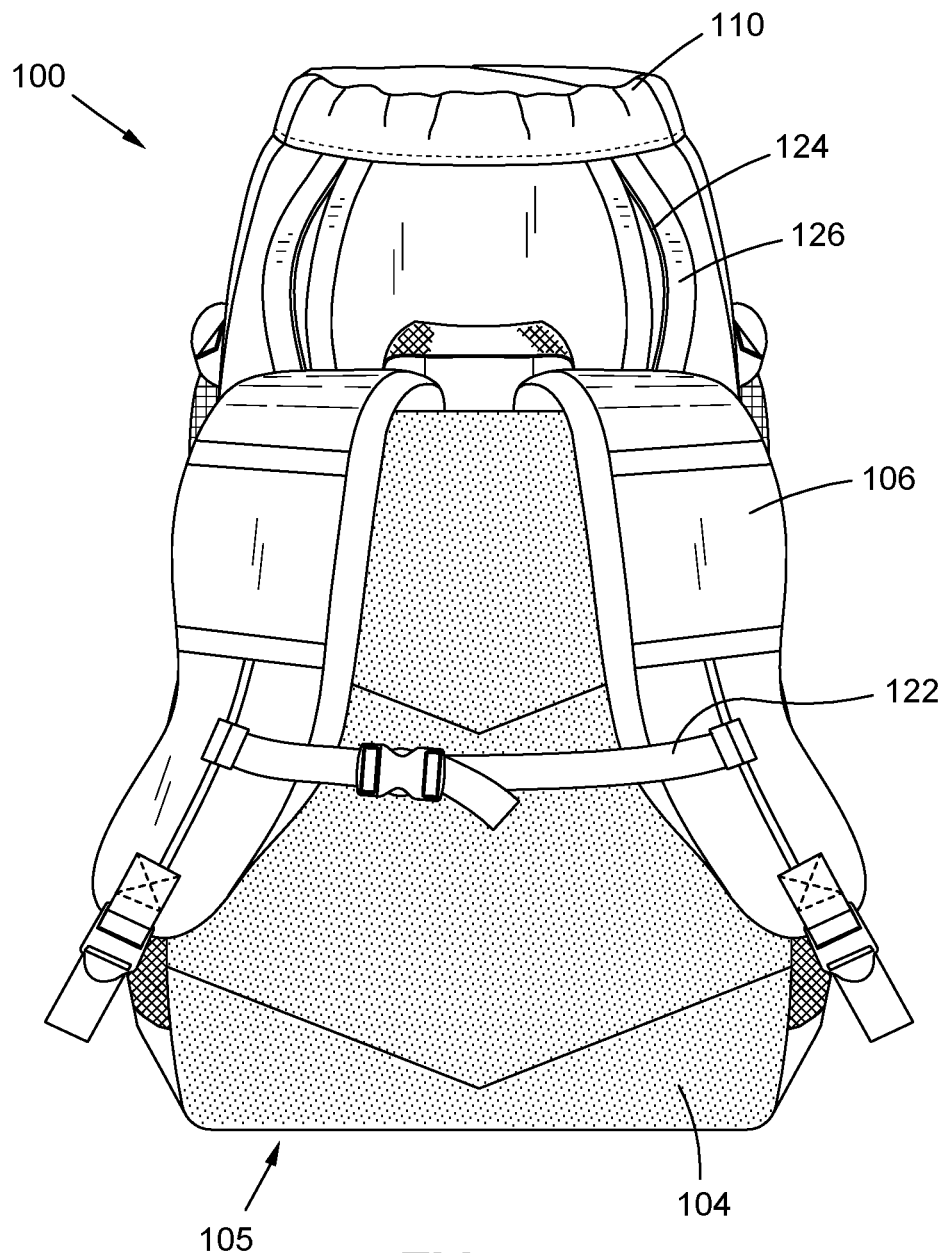
FIG. 2 shows a rear perspective view of the pet carrying backpack of FIG. 1.

FIG. 1 shows a front perspective view of a front facing, pet carrying backpack according to an exemplary embodiment, and FIG. 2 shows a rear perspective view of the pet carrying backpack of FIG. 1. A pet carrying backpack 100 is formed from a front panel 104, a rear panel 102, two side panels 103, and a bottom panel 105.

The front panel 104 comprises shoulder straps 106 attached to the front panel 104 to facilitate the carrying of the backpack 100 on a user's shoulders. In some embodiments, a sternum strap 122 may be provided on the shoulder straps 106. On an upper portion of the front panel 104 above the should straps 106, paw holes 124 are provided. The paw holes 124 allow the pet riding in the backpack 100 to face forward, that is face in same direction as the user wearing the backpack 100. In some embodiments, the paw holes 124 may be lined with a padded, elastic liner 126 that increases the comfort of the pet while the pet's paws extend through the paw holes 124.

The side panels 103 may be at least partially formed from a mesh material 114. The mesh material 114 allows air to ventilate into the interior of the backpack 100 to regulate the temperature of a pet riding therein. The side panels 103 may further comprise one or more pockets 116. Here, the pockets 116 are also formed at least partially from a mesh material so as not to impede air flow through the mesh 114 of the side panel 103. The side panels 103 may further comprise adjustment straps 118 which may be tightened and loosened to adjust the size of the interior of the backpack 100 to fit the pet riding therein. In one exemplary embodiment, the adjustment strap 118 may be oriented diagonally with respect to the side panel 103. For example, the adjustment strap 118 may be oriented at an angle between 25 degrees and 65 degrees relative to a vertical edge 103a of the side panel 103. More preferable, the angle of the adjustment strap 118 relative to the vertical edge 103a of the side panel is between 35 and 55 degrees.

The rear panel 102 comprises an access zipper 108 that extends to the top of the backpack 100. When the access zipper 108 is open, wide and unobstructed access to the inside of the backpack 100 is provided. This allows easy loading and unloading of a pet riding in the backpack 100. Pet lumbar support straps 109 are provided and are attached to the rear panel 102 on both sides of the zipper 108. These provide added safety by taking the weight of the pet off of the zipper 108. The pet lumbar support straps 109 further provide lumbar support to the pet riding in the backpack 100. The contour of the interior of the backpack 100 may also be adjusted via the pet lumbar support straps 109.

In some embodiments, the lumbar support straps 109 are sewn to the rear panel 102. In other embodiments, the lumbar support straps 109 may extend and be attached at a seam 102a between the rear panel 102 and the side panels 103. This increases the surface coverage and stability provided by the lumbar support straps 109.

A collar 110 is provided at the top of the backpack 100 above each of the front, rear, and side panels 102, 103, 104. The collar 110 is adjustable by way of a collar adjustment strap 112. This allows the backpack 100 to be fitted around the neck of the pet to prevent the pet from jumping out of the backpack 100 during use.

When a pet is loaded into the backpack 100, the pet sits on the bottom panel 105 of the bag. The bottom panel 105 may be formed from a thick, padded material providing a sturdy and comfortable seat for the pet.

Other features of a front-facing, pet carrying backpack may also be provided. Such features are discussed in more detail in U.S. application Ser. No. 15/821,539 and in U.S. application Ser. No. 16/547,372, the contents each of which are hereby incorporated by reference.

Backpacks for Differently Sized Pets that are Waist-Strap Compatible

Front facing, pet-carrying backpacks are preferably provided in different sizes to accommodate differently sized pets. For a larger pet, the length, width, and height of the backpack are greater than a backpack design for a smaller pet. This is of course so that the pet fits comfortably within the backpack. For example, if the height of the backpack 100 is too long for a given pet, than the pet will not be able to sit on the bottom panel 105 of the backpack 100 with its paws through the paw holes 134 and its head above the collar 112. Thus, the backpack for this pet must be sized small enough so that the pet may comfortably ride in the backpack.

Many users of backpacks prefer a backpack design with a waist strap. Especially in applications where a user will carry a backpack for an extended time, a waist strap allows the user to transfer a large portion of the weight of the backpack from the user's shoulders to the user's hips. This makes the backpack much easier to carry, especially if carrying a heavier load or wearing the backpack over an extended time.

However, if a user of a front facing, pet-carrying backpack has a smaller pet, the backpack is typically sized such that the bottom panel, such as bottom panel 105 of the backpack 100, is located well above the user's waist. In this instance, a waist strap would not be compatible with the backpack 100.

Figure 3A:
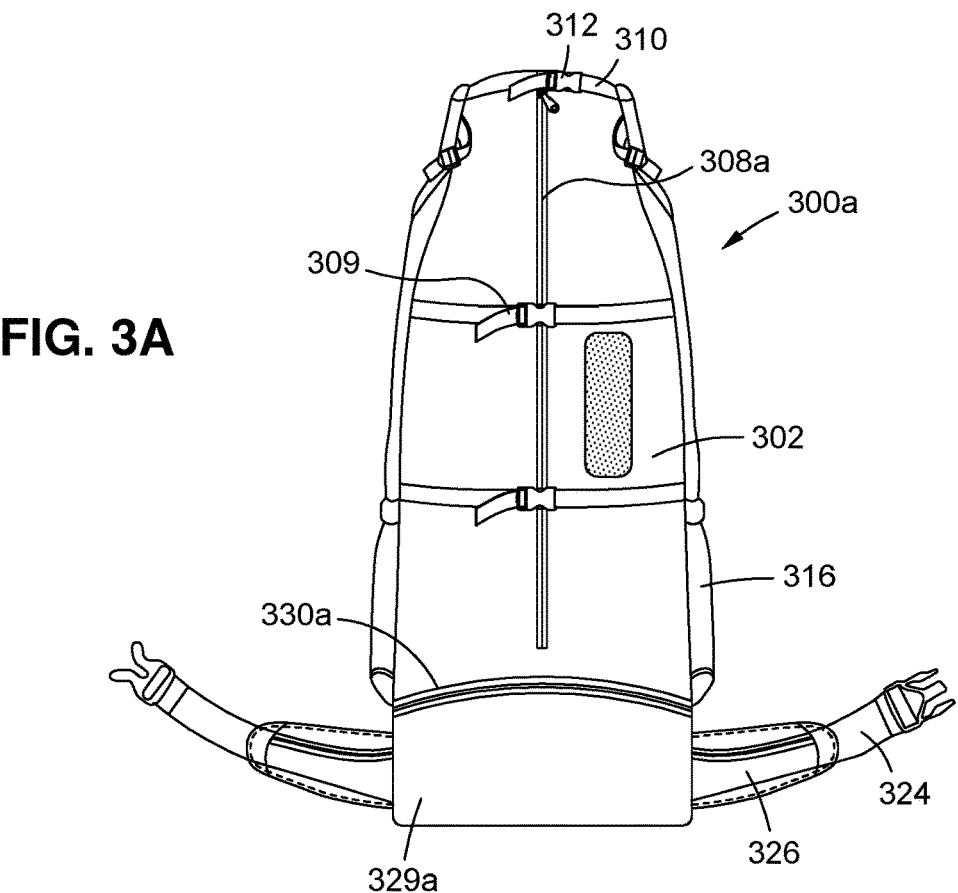
FIG. 3A and FIG. 3B show examples of front-facing pet carrying backpacks for differently sized pets that are waist-strap compatible.
Figure 3B:
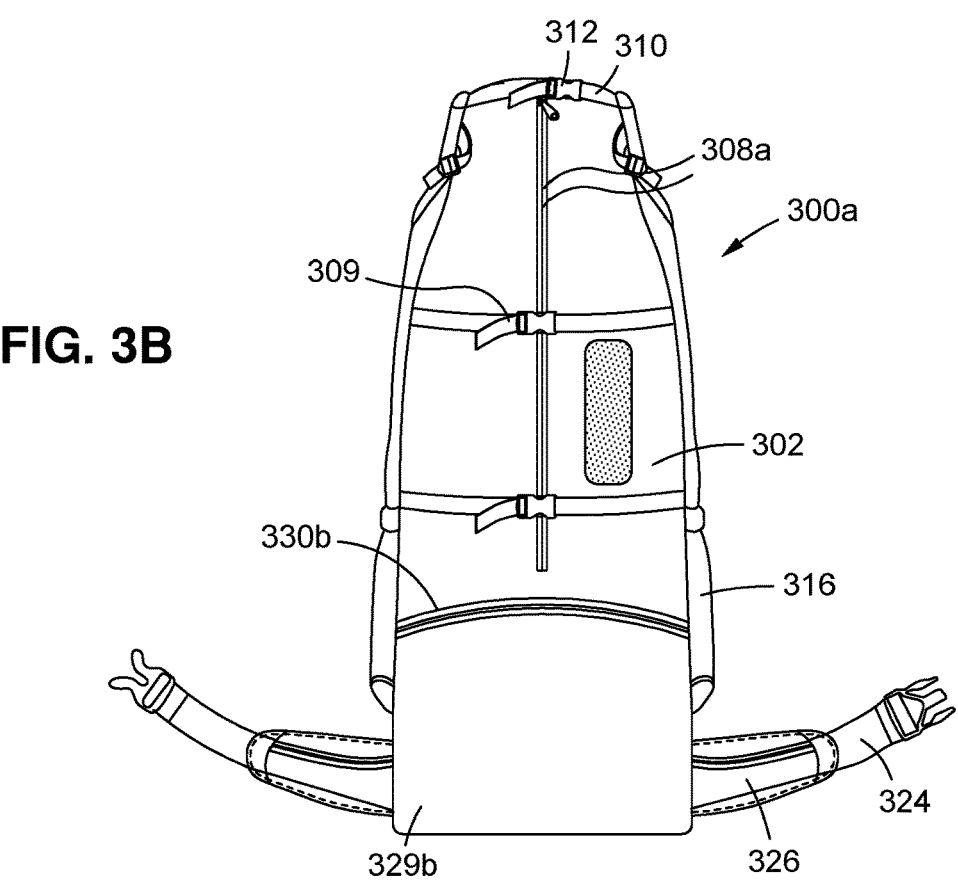
Figure 3C:
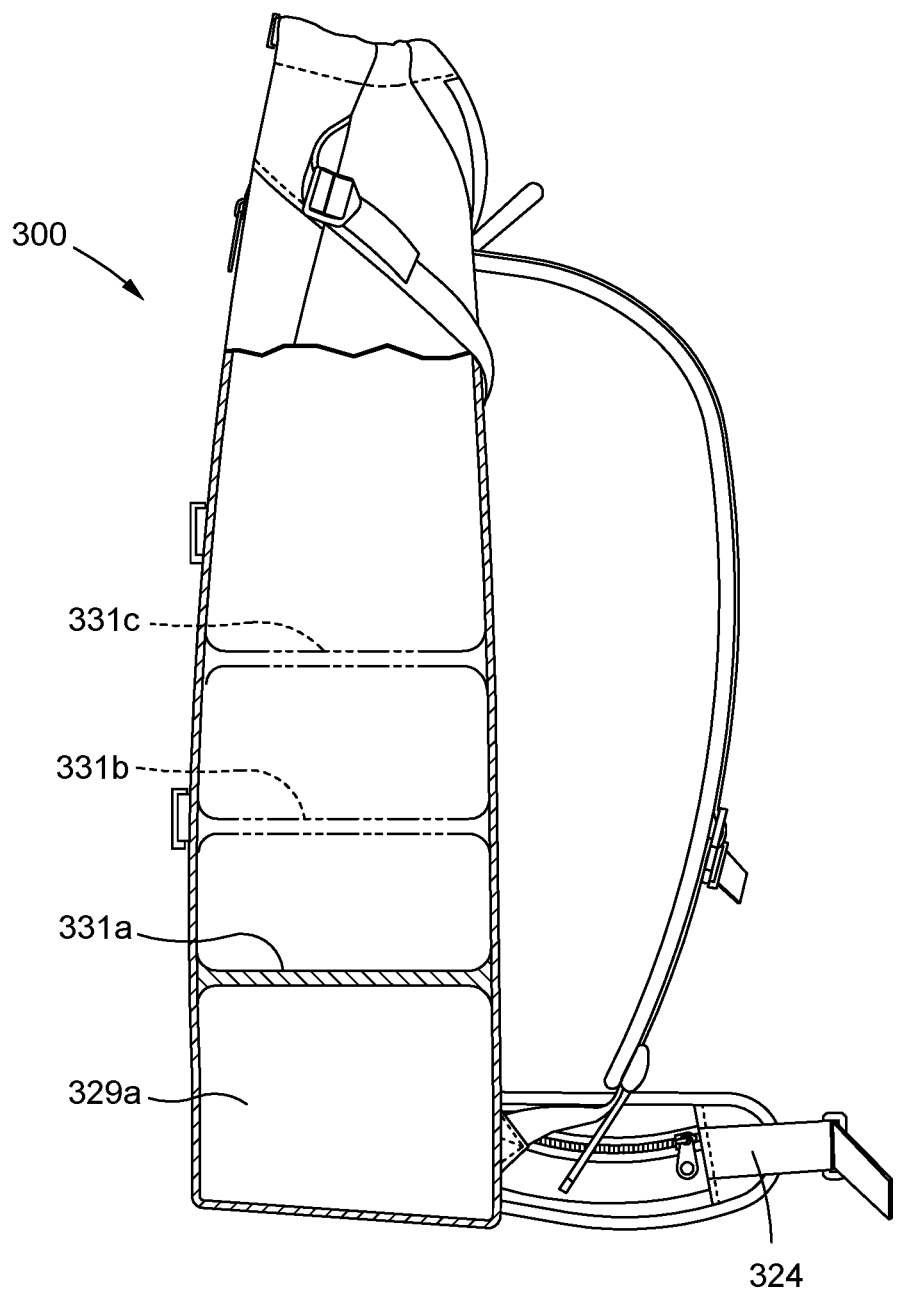
FIG. 3C shows a side cut-away view of the backpacks in FIG. 3A and FIG. 3B.

FIG. 3A and FIG. 3B show examples of front-facing pet carrying backpacks for differently sized pets that are waist-strap compatible. FIG. 3C is a side cut-away view of the backpacks in FIG. 3A and FIG. 3B. As shown in FIG. 3A, a front-facing, pet carrying backpack 300a includes several similar features as the backpack 100. For example, the backpack 300a includes a rear panel 302 with an access zipper 308a and pet lumbar support straps 309. At the top of the backpack is a collar 310 with a collar adjustment strap 312. The backpack 300a may optionally have side pockets 316.

The backpack 300a is fitted with a waist strap 324. The waist strap 324 may be similar to other bags with waist straps. For example, the waist strap 324 may have a pocket 326 configured to hold small items so that they are easily accessible to the user. The waist strap 324 is configured to strap around a user's waist to transfer the weight of the backpack 300a to the user's hips.

The backpacks 300a includes the waist strap 324 while also being correctly sized for a particular sized pet. To achieve this, the backpack 300a includes a lower storage compartment 329a that is separated from the rest of the interior of the backpack 300a. The separation is created by the placement of the thick, padded seat 331a for the pet on the inside of the backpack (see FIG. 3C). The thick, padded seat 331a is not placed at the bottom of the bag to define the bottom panel 105 as in the backpack 100 (FIGS. 1 and 2). The thick padded seat 331a is disposed above the lower storage compartment 329a and forms the separation of the lower storage compartment 329a from the rest of the interior of the backpack 300a which holds the pet being carried. A lower zipper 330a provides access to the lower storage compartment 330a.

Through the placement of the thick, padded seat 331a, the backpack 300a may be sized for a particular sized pet while still being long enough so that the waist strap 324 comfortably extends around the user's waist. Using this arrangement, backpacks accommodating several different sizes of pets may be provided all while simultaneously remaining compatible with a waist strap 324.

FIG. 3B shows a backpack 300b. The backpack 300b is similar to backpack 300a except that the backpack 300b fits a smaller pet than the backpack 300a. The backpack 300b also includes a lower storage compartment 329b. However, the lower storage compartment 329b is larger than the lower storage compartment 329a. The lower zipper 330b providing access to the lower storage compartment 329b is disposed higher up on the backpack 300b, and the access zipper 308b is shorter. This is because the thick, padded seat 331b (see FIG. 3) is disposed higher in the backpack 300b, accommodating a smaller pet than the backpack 300a.

As shown in FIG. 3C, a thick padded seat 331a, 331b, 331c may be disposed at any desirable position in the backpack 300. This changes the relative sizes of the interior for the pet and the lower storage compartment 329a, allowing the backpack 300 to be sized to carry differently sized pets while still being compatible with the waist strap 324.

Various modification may be made in the backpack 300. For example, the backpack 300 may include an internal frame. The internal frame may also extend through the thick padded seat 331a, 331b, 331c to provide extra rigidity and comfort to the pet and the user. In some embodiments, the lower storage compartment 329a, 329b may be subdivided to include separate storage areas or pockets. In other embodiments, the placement of the lower zipper 330a, 330b on the bags 300a 300b may be in the same position between the differently sized bags for design consistency.

Angled Pet Support Surface

It has been found the many users of backpacks prefer to wear backpacks too loose. This may be because users prefer the straps loose enough to be able to quickly put on and remove the straps with little effort. Regardless, wearing a backpack too loosely may result in problems when wearing a pet carrying backpack.

When wearing a pet carrying backpack too loosely, the weight of the pet causes the backpack to sag. This results in the back of backpack being lower than the front of the backpack. When the back of the backpack is lower than the front, the bottom of the backpack is not flat. Instead the bottom of the backpack is angled down such that the pet sitting on the bottom of the backpack is slanted away from the user. This causes the weight of the pet to shift against the back panel of the backpack, decreasing the comfort and sense of security of the pet.

Figures 4A, 4B:
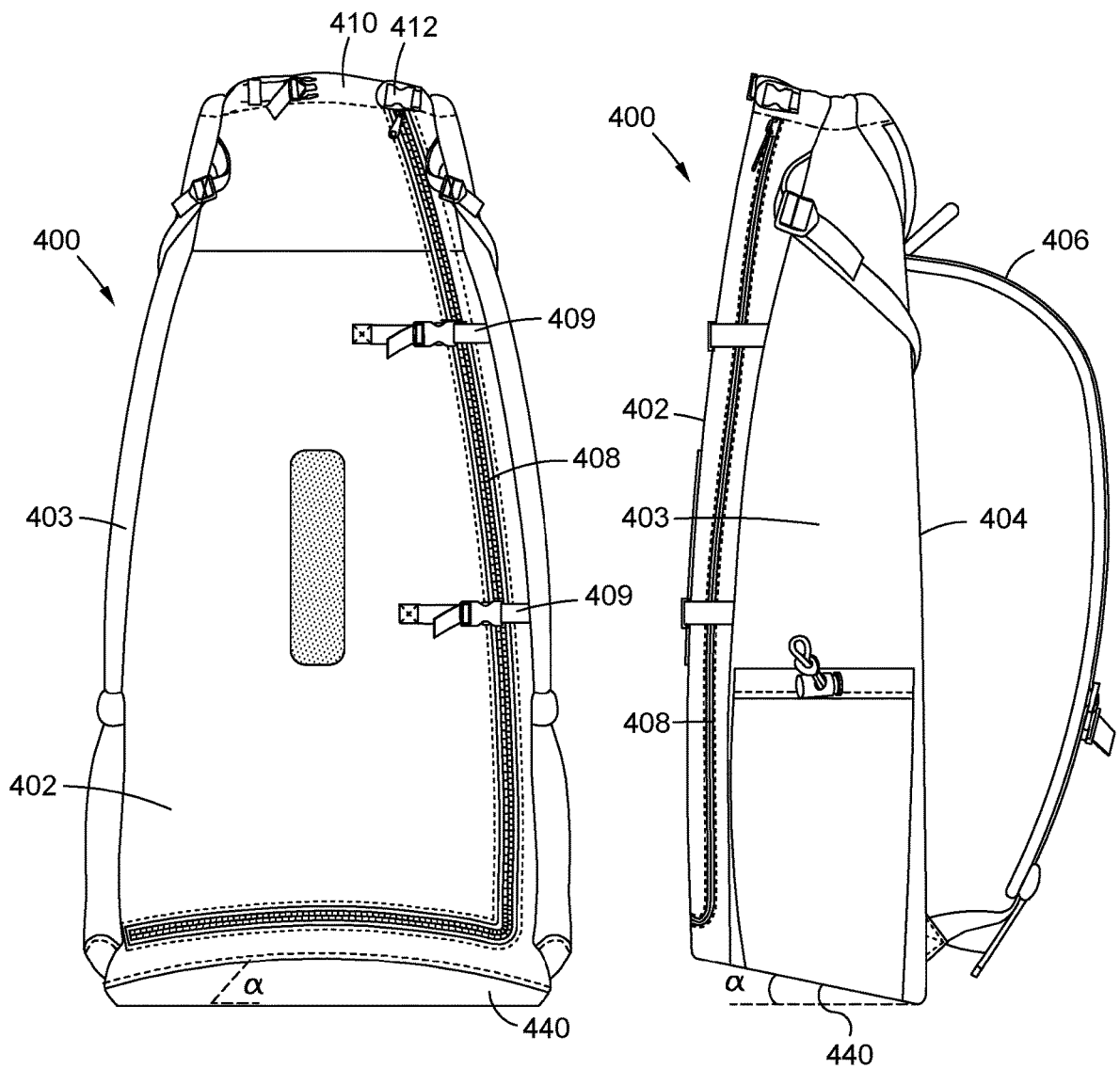
FIG. 4A shows a rear view of a front-facing, pet carrying backpack according to another exemplary embodiment.
FIG. 4B shows a side view of the backpack of FIG. 4A.

FIG. 4A shows a rear view of a front-facing, pet carrying backpack according to another exemplary embodiment, and FIG. 4B shows a side view of the backpack of FIG. 4A. A front-facing, pet-carrying backpack 400 is formed from a front panel 404, a rear panel 402, two side panels 403, and a bottom panel 440. In this embodiment, the backpack construction is such that bottom panel 440 is angled upwards from the front panel 404 to the rear panel 402 as denoted by an angle $\alpha$.

The angled bottom panel 400 ensures a comfortable and secure ride for a pet being carried in the backpack 400. The pet may comfortably sit with its weight towards the front panel 404 of the backpack 400 even if a user wears the shoulder straps 406 of the backpack 400 too loosely. An optimal angle $\alpha$ of the bottom panel 440 may be around 20 degrees. Preferably the angle is between 5 degrees and 45 degrees, and more preferably between 10 and 30 degrees. It should also be noted that while FIGS. 4A and 4B show the angled support surface built into the bottom panel 400, the angled support surface may be applied to an internal pet support surface such as padded seats 331a, 331b, and 331c shown above in FIG. 3C

L-Shaped Zipper

The backpack 400 includes an access zipper 408. As shown in FIG. 4A, the access zipper 408 differs from the access zipper 108 in that the access zipper 408 runs along the side and bottom of the rear panel 402 of the backpack 400. The access zipper 408 allows almost the entire front panel 402 to fold over and away from the backpack 400. This allows unobstructed access to the interior of the backpack 400. This "L-shaped" access zipper 408 facilitates easy loading and unloading of a pet to be carried in the backpack 400.

For example, a pet may be more comfortable being loaded into the backpack 400 without the user holding the pet and lifting the pet into the backpack. This may be done by laying the backpack 400 on a flat surface with the front panel 404 facing down. The access zipper 408 may be completely opened and the front panel 402 may be folded away from the backpack 400. The pet may be led to sit or lie down in the interior of the backpack with the front panel 402 folded away. With the pet in position, the front panel may be put back into position by closing the access zipper 408 around the pet.

The backpack 400 further comprises pet lumbar support straps 409. Similar to the support straps 109, these straps are connected at both sides of the access zipper 408 to decrease the stress on the access zipper 408 and to correctly size the backpack 400 around the pet.

The "L-shaped" access zipper 408 provides other benefits. For example, with the vertical portion of the access zipper 408 being adjacent to one of the side panels 403, the zipper does not rest against the pet's spine during use. This increases the comfort of the backpack 400 for the pet, allowing the pet to comfortably spend more time in the backpack 400.

Adjustable Oval Paw Holes

Figure 5:
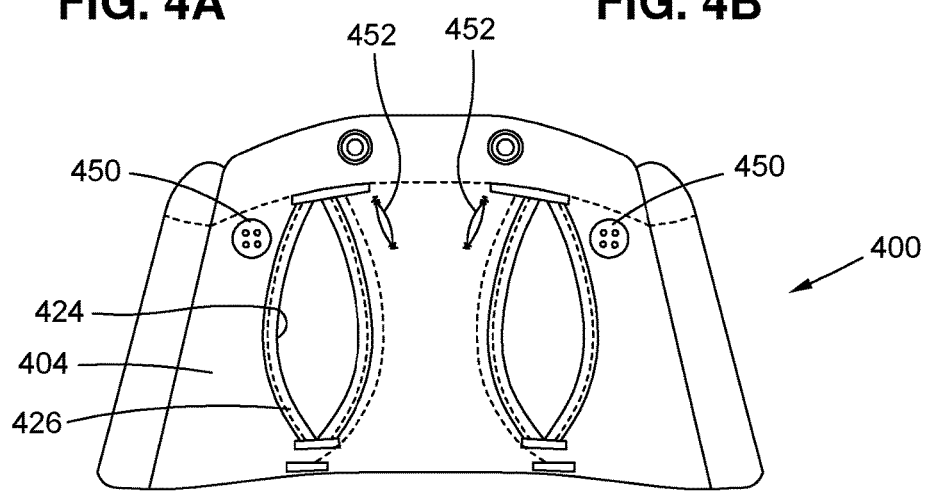
FIG. 5 shows an enlarged view of the top of a front panel of the pet carrying backpack shown in FIGS. 4A and 4B.

FIG. 5 shows an enlarged view of the top of a front panel of the pet carrying backpack shown in FIGS. 4A and 4B. As shown in FIG. 5, the front panel 404 of the backpack 400 comprises paw holes 424. Unlike the paw holes 124, the paw holes 424 are formed or cut out of the front panel 404 to be open and rounded, forming an oval or pointed-oval shape. This shape prevents the paw holes 424 from irritating the pet's forelegs. To provide further comfort, the pawl holes are surrounded by padded, elastic liner 426.

So that the backpack 400 may accommodate pets with differently sized forelegs, the paw holes 424 may be adjustable. For example, as shown in FIG. 5, a button 450 and corresponding button-hole 525 may be added to the front panel 404 of the backpack 400 to surround each paw hole 424. If the user desires to make the paw hole 424 smaller, the user simply closes up the top part of the paw hole 424 by fastening the button 450 in the button hole 452.

Of course, other fastener besides buttons may be used such as snapping fasteners, magnetic fasteners, hook and loop fasteners, etc. Further, more than one set of fasteners may be placed next to each paw hole 424. The fasteners may be placed adjacent to the top of the paw hole 424 or the bottom of the paw hole 424 to adjust the size of the paw hole 424.

Hood and Storage

Figure 6A:
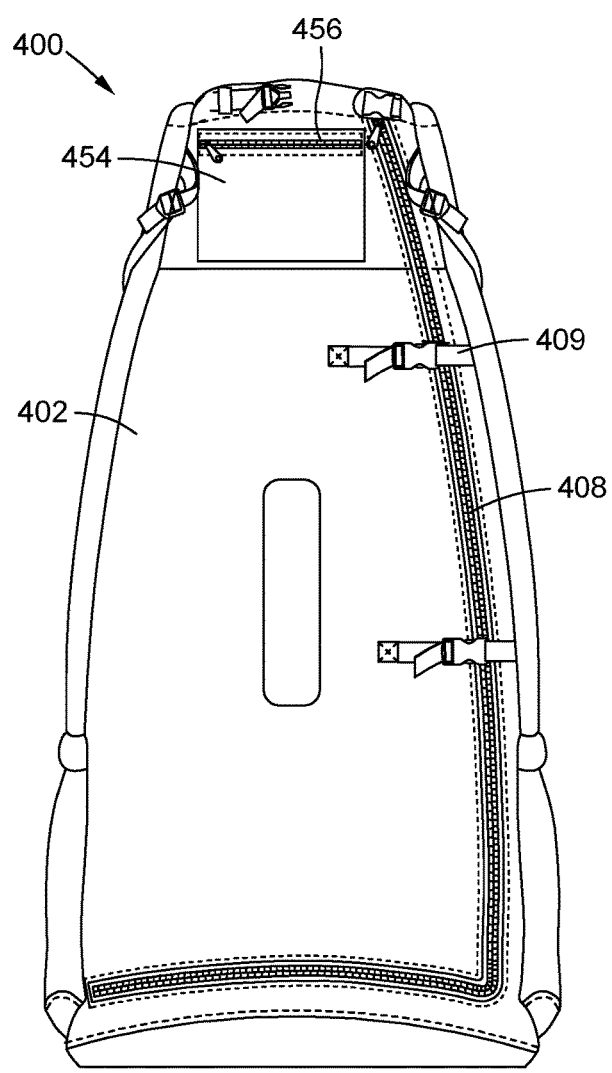
FIG. 6A, FIG. 6B, FIG. 6C, and FIG. 6D show views of a front-facing, pet carrying backpack with a hood and hood storage, according to one exemplary embodiment.

FIG. 6A, FIG. 6B, FIG. 6C, and FIG. 6D show views of a front-facing, pet carrying backpack with a hood and hood storage, according to one exemplary embodiment. FIG. 6A shows a rear view of the backpack 400. Here, the backpack 400 is fitted with a hood. The hood is stored in a hood storage compartment 454 on an upper portion of the rear panel 402. The L-shaped zipper 408 provides adequate space for the placement of the hood storage compartment 454 on the rear panel 402. A zipper 456 is provided to control access to the hood storage compartment 454.

Figure 6B:
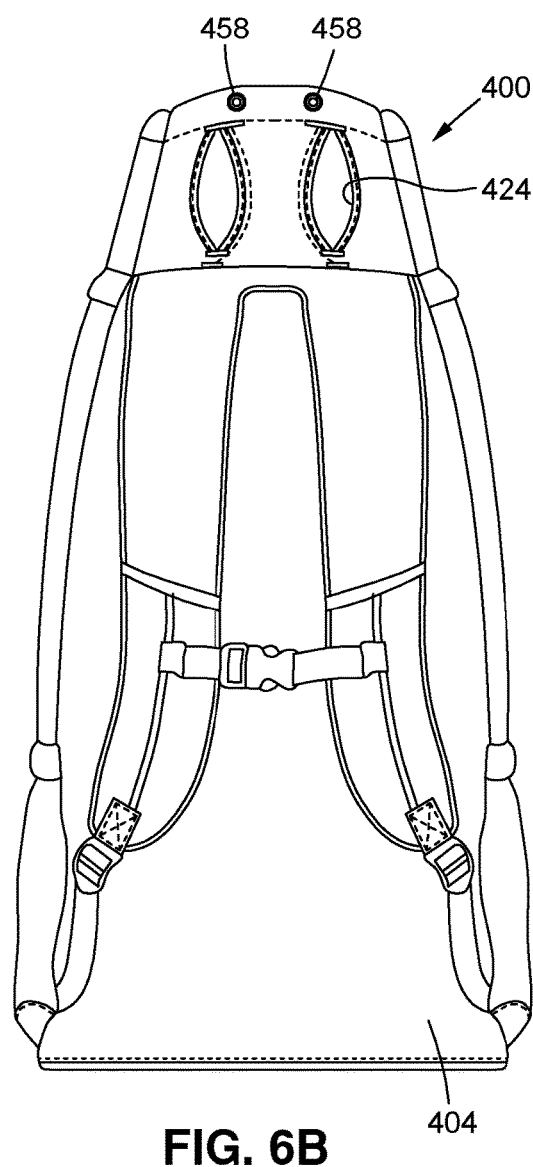

As shown in FIG. 6B, on a top portion of the front panel 404 there are two snap fasteners 458. As will be described below, the snap fasteners 458 facilitate the placement of the hood over a pet during use.

Figure 6C:
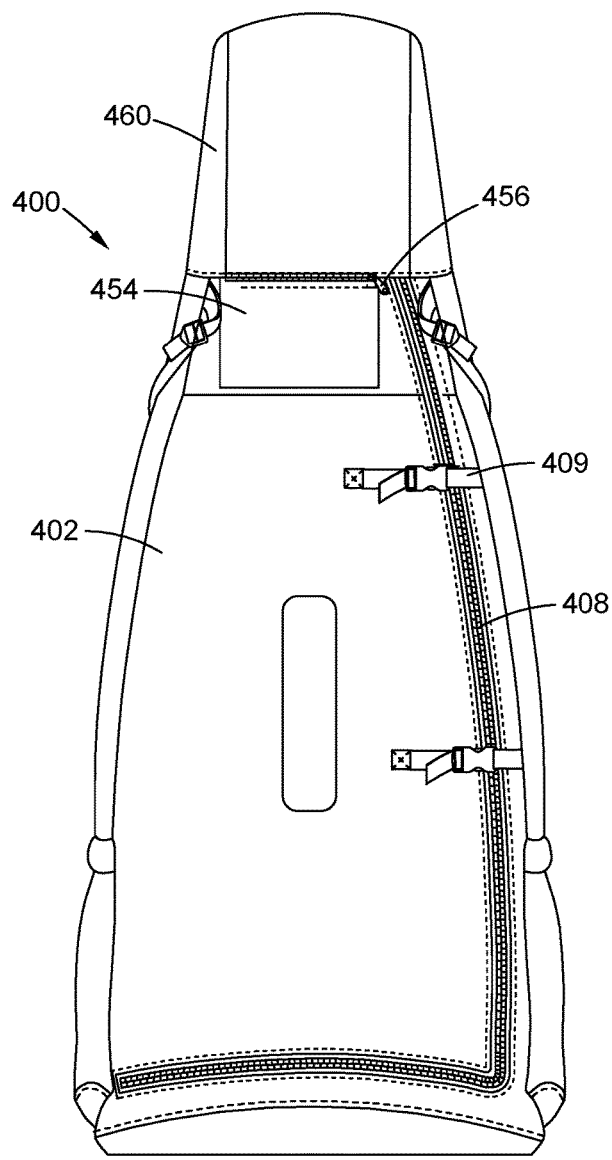

FIG. 6C shows a rear view of the backpack 400 with the hood 460 deployed. The hood 460 may be deployed out from the hood storage compartment 454 by opening the zipper 456. The hood 460 may be permanently attached to the backpack 400 inside the hood storage compartment 454, such as by stitching.

Figure 6D:
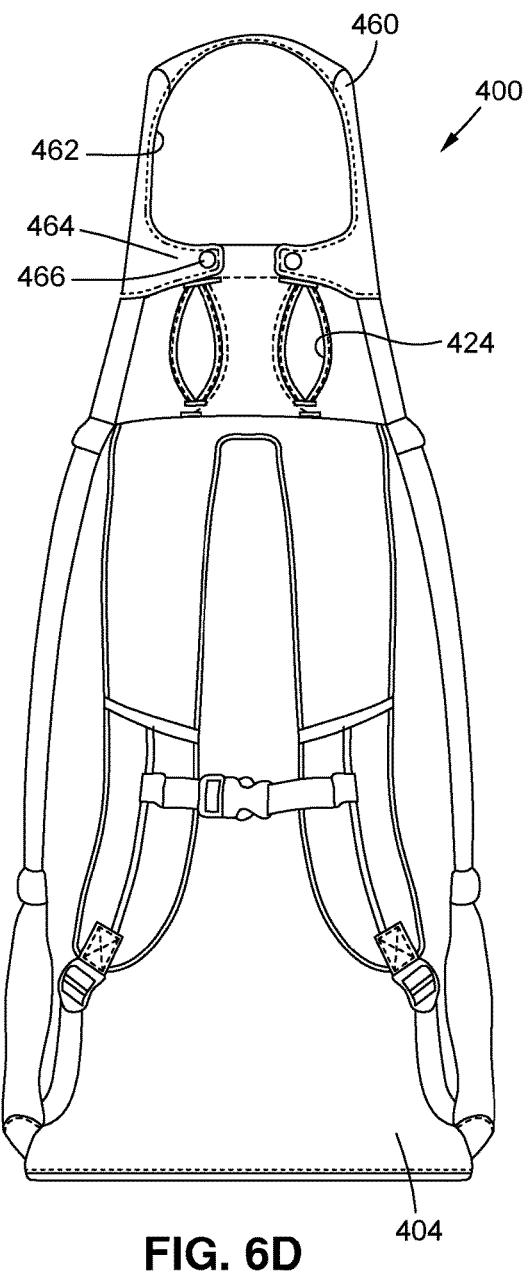

FIG. 6D shows a front view of the backpack 400. Here the hood 460 is shown in a deployed position. The hood 460 includes a front opening 462 through which a pet is able to see out while the hood 460 is in use. At the bottom of the opening 462, two tabs 464 are provided that extend around the top of the front panel 404. The tabs 464 include snap fasteners 466 that correspond to the snap fasteners 458 to attach the tabs 464 to the front panel 404, holding the hood 460 in position. In this matter, shade or rain/snow protection can be provided to the pet riding in the backpack 400.

While snap fasteners 458 and 456 are described and shown here, other fasteners may also be used, such as buttons, magnetic fasteners, hook and loop fasteners, and the like. Further in some embodiments, the hood 460 may not be permanently attached to the backpack 400. Instead, the hood 460 may be fastened to the backpack 400 via fasteners or a zipper.

Harness

Figure 7A:
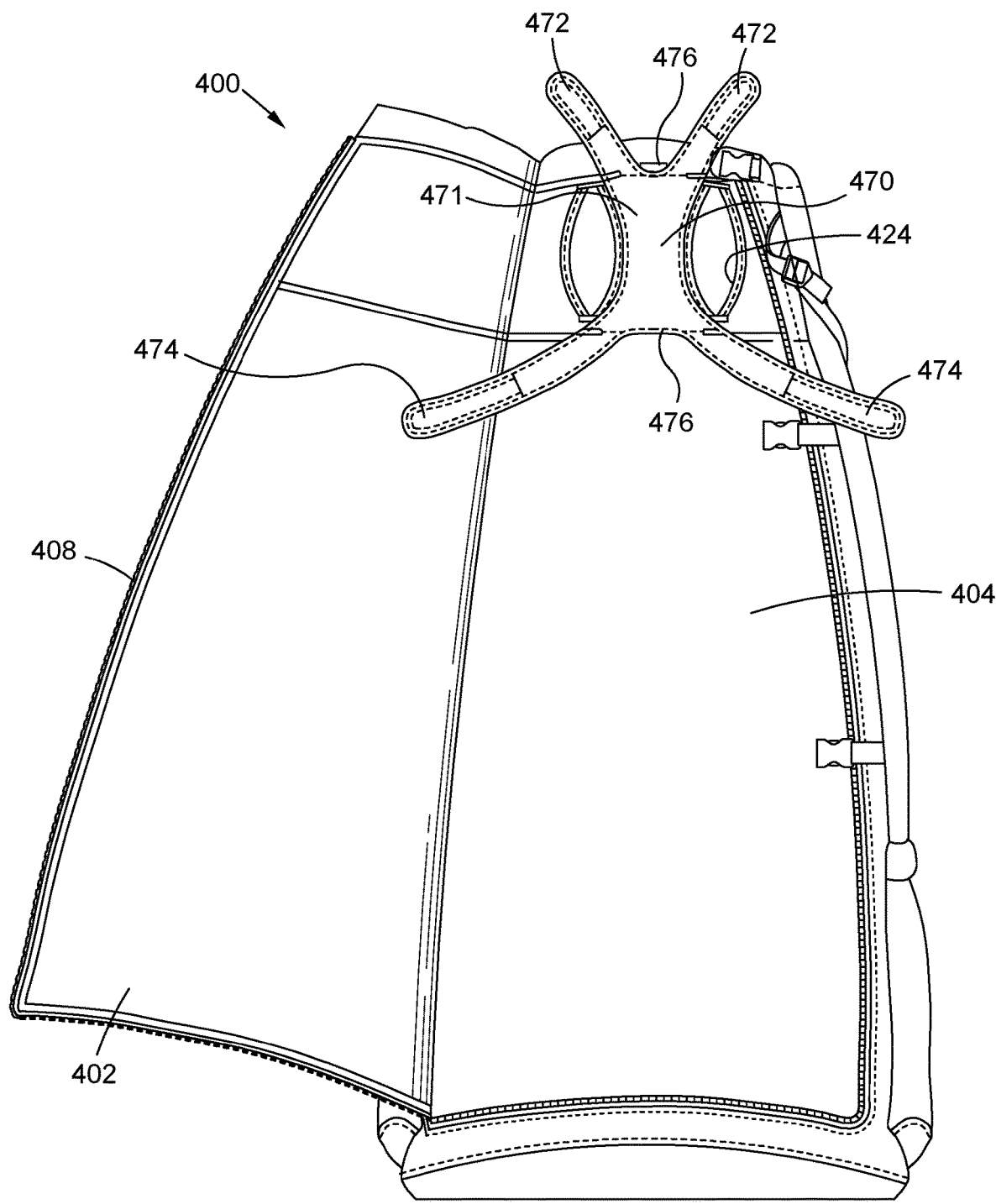
FIG. 7A shows an interior of a front-facing, pet-carrying backpack with a harness, according to an exemplary embodiment.

FIG. 7A shows an interior of a front-facing, pet-carrying backpack, according to an exemplary embodiment. Here, the backpack 400 is shown with the zipper 408 unzipped and the rear panel 402 folded away from the backpack 400 revealing the interior of the backpack 400. Between the paw holes 424, a harness 470 is attached to the backpack 400. More specifically, the harness 470 is attached such that the chest portion 471 of the harness 470 is placed between the arm holes 424.

The harness 470 may be sewn into the design of the backpack 400 to be permanently attached, such as via seams 476. In other embodiments, the harness 470 may be removable to be worn by the pet outside of the backpack 400 as well as in. When the harness 470 is removed, the harness 470 may be placed onto the pet prior to loading the pet into the backpack 400. In one example of a removable harness 470, the harness 470 may have a plastic turn fastener that extends through a hole in the front panel 404 of the backpack that twists to lock to the harness in place. However, this is just one example of a connection mechanism and other connection mechanisms may be used.

The harness 470 may be configured to have two upper attachment straps 472 and two lower attachment straps 474. The upper attachment straps 472 extend over the neck/shoulders area of the pet and fasten together, such as using a buckle type fastener, snaps, pinch clip, hook and loop, or any other desirable fastener. The lower attachment straps 474 extend under the forelegs of the pet and around the torso area of the bet and fasten together.

FIGS. 7B, 7C, and 7D show another exemplary embodiment of a harness compatible with a pet carrying backpack. Here, a harness 770 is shown having a chest portion 771. The harness 770 is removable and includes a turn fastener 775 that extends through a corresponding aperture in a pet-carrying backpack. The harness 770 has an upper attachment loop 772 that extends over the neck/shoulder area of the pet. The loop 772 may be configured to be pulled over the head of the head of the pet, or it may include a fastener to releasably attach around the neck/shoulder area of the pet, such as a hook-and-loop fastener, a buckle, a clip, etc.

The harness 770 further includes lower attachment portions 774. A lower strap 777 is attached to one of the lower attachment portions 774 and is configured to extend around the back of the pet and attach to the other lower attachment portion 774 such as via a clip fastener 778. A stability strap 780 may extend from the lower strap 777 to the upper attachment loop 772.

In this embodiment, the harness 770 is configured to accommodate a storage bag (not shown). In some instances, it may be desirable for a larger dog to carry a storage bag when the dog is not in the backpack. The harness 770 includes bag attachment clips 779 attached to both the upper attachment loop 772 and the lower attachment portion 772. To provide further stability a loop 781 is provided on the stability strap 780. The clips 779 and loop 781 attach to the storage bag to securely hold the storage bag relative to the harness 770.

The removable or permanently attached harness 470, 770 provides several advantages. When the pet wears the harness 470, 770 in the backpack 400, the pet cannot pull out of the backpack 400 if it is spooked, increasing the safety for the pet and the user. Further, the harness 470, 770 helps to support the weight of the pet, taking weight off of the hind legs of the pet. This increases the comfort of the pet, and also increases the duration of the time that the pet may spend in the backpack 400. The harness 470, 770 also keeps the pet toward the front of the backpack 400 while the backpack 400 is worn by the user. This provides better balance and makes the backpack 400 easier to wear while carrying a pet.

Convertible Pen

When pet owners transport pets by carrying them, such as by using a pet-carrying backpack 100, 300, 400 described herein, they may find that they need to contain the pet at a destination. For example, after carrying a pet to a restaurant, airport, or other public place, it may be best that the pet remained confined to a certain area to avoid spooking the pet or to prevent the pet from contacting people in the area who may have pet allergies from the pet. On the other hand, portable pet pens have been used by pet owners to contain pets in public places, but such pens may be hard to carry with the pet riding therein.

Figures 8A, 8B:
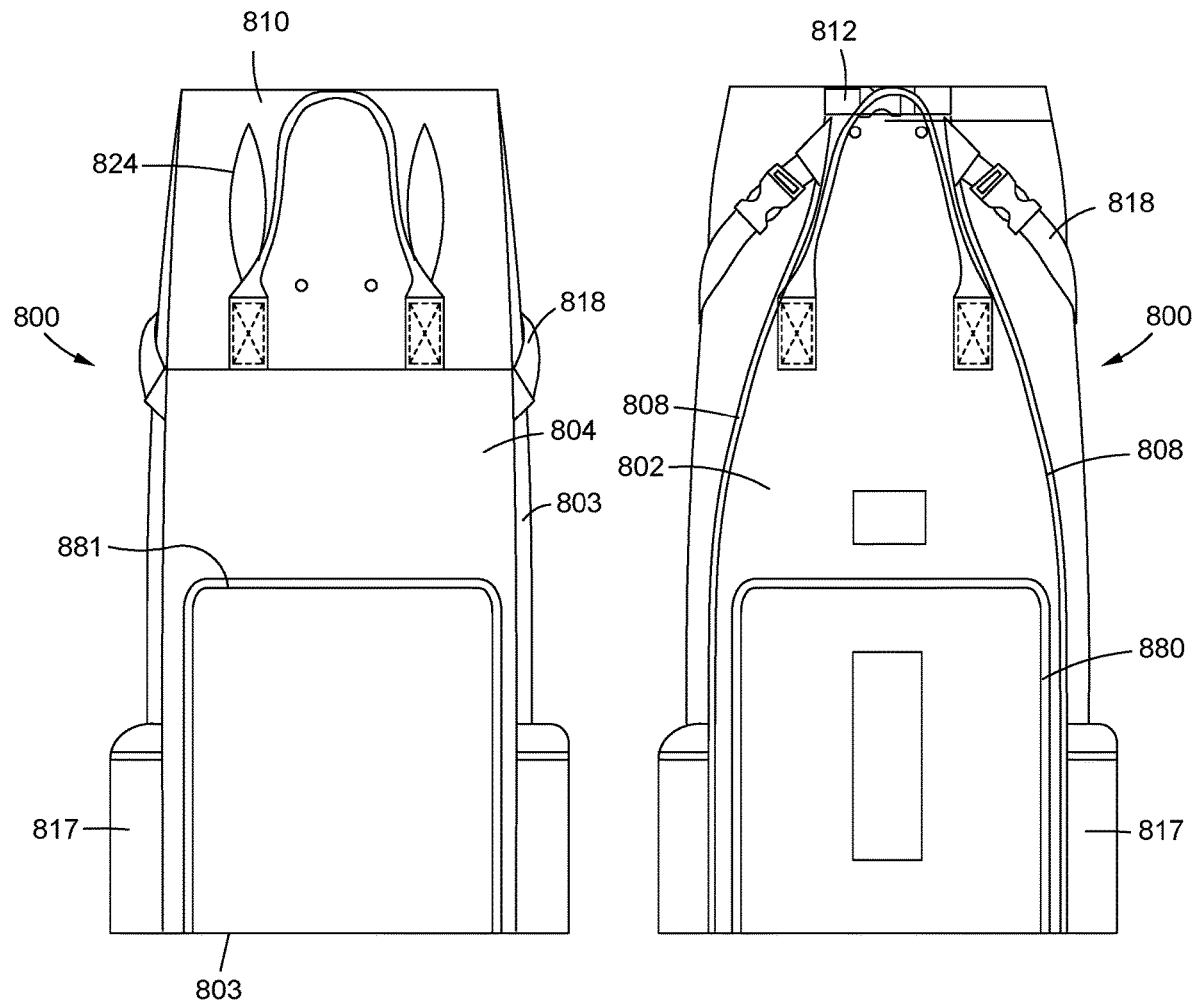
FIG. 8A, FIG. 8B, FIG. 8C, and FIG. 8D show embodiments of a front-facing pet carrying backpack that is convertible to a travel pet pen, according to one exemplary embodiment.

FIG. 8A, FIG. 8B, FIG. 8C, and FIG. 8D show embodiments of a front-facing pet carrying backpack that is convertible to a travel pet pen, according to one exemplary embodiment. As shown in FIGS. 8A and 8B, a front-facing, pet-carrying backpack 800 comprises a front panel 804, a rear panel 802, and side panels 803. Shoulder straps 806 are attached to the front panel 804 to allow the user to wear the backpack 800 on his/her back (not shown in FIG. 8A so that other features can more easily be shown. See FIG. 8C). Paw holes 824 are disposed above the shoulder straps 806 on the front panel 804. When a pet sits in the backpack 800, the pet's paws may extend through the paw holes 824.

The backpack 800 comprises a collar 810 on the top of the backpack 800. The collar 810 extends around the pet's neck during use and is adjusted by the collar strap 812. In this embodiment, two access zippers 808 are disposed on the rear panel 802. When the access zippers 808 are unzipped, the rear panel 802 may be folded downwards and away from the backpack 800 so that a pet may walk to and lie down in the interior of the backpack 800, such as by lying down and resting against the interior side of the front panel 804, for loading.

The backpack 800 may include other accessories such as pockets. For example, several rear pockets may be disposed on the rear panel 802 of the backpack 800 to provide flexible storage options to the user. The pockets may be sewn onto the rear panel 802 or may be attached in any suitable manner. The pockets may include zippers to close the pockets or other fastening mechanisms.

Figure 8C:
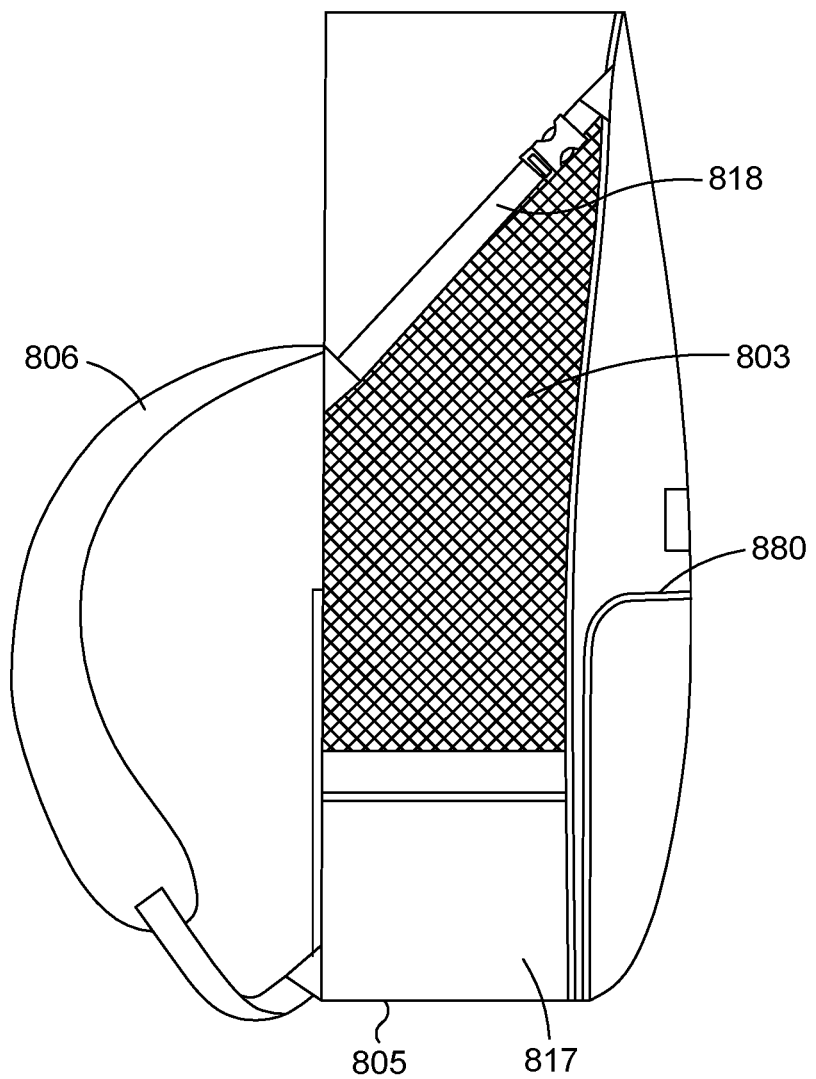

As shown in FIG. 8C, the side panels 803 may comprise side storage pockets 817 for added storage. The side panels 803 may be formed from a mesh material to allow ventilation into the interior of the bag to help regulate a pet's temperature. In some embodiments, the side panel may also include a fabric cover over the mesh with a vent access zipper to selectively open and close the side panel 803 to expose the mesh lining. When the zipper is open, air may flow through the lining to cool a pet riding therein. Adjustment straps 818 are also provided along the side panel 803 as shown to adjust the interior space of the backpack 800 to accommodate differently sized pets.

Returning to FIGS. 8A and 8B, the backpack 800 further comprises a front pen release zipper 881 disposed on the front panel 804 of the backpack 800 and a rear pen release zipper 880 disposed on the rear panel of the backpack 800. The front pen release zipper 881 extends from the bottom of the backpack 800 near one side panel 803 towards the top of the backpack 800 under the shoulder straps 806 and down the other side. The front pen release zipper 881 may extend to any desirable height on the front panel 804 based on the size of the convertible pet pen desired. Similarly, the rear pen release zipper 880 extends from the bottom of the backpack 800 near one side panel 803 towards the top of the backpack 800 to under the collar 810 and down the other side. The rear pen release zipper 881 may extend to any desirable height on the rear panel 802 based on the size of the convertible pet pen desired. The rear pen release zipper 880 is disposed on the rear panel 802 just inside the two access zippers 808 as shown in FIG. 8B.

Figure 8D:
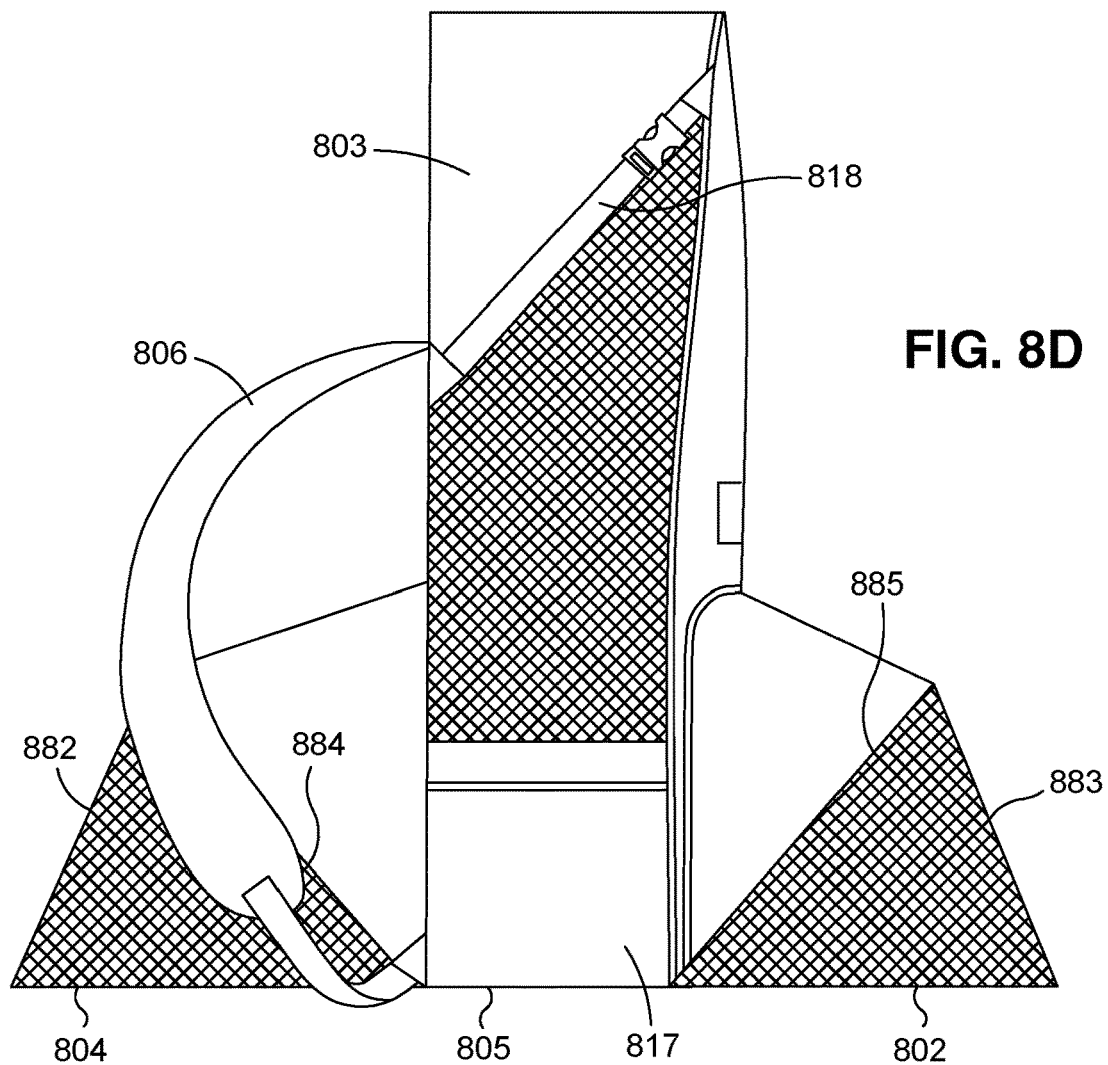

The front and rear pen release zippers 880, 881 are configured to release a pet pen. As shown in FIG. 8D, when the front pen release zipper 881 is unzipped, at least a portion of the front panel 804 folds away from the side panels 803 deploying a front pen portion 882 of the pet pen. The front pen portion 882 may be formed from a mesh material that allows the pet to see out and provides ventilation to the front pen portion 882 while being sufficiently strong to retain the pet within the front pen portion 882 of the pet pen. The structure of the front pen portion 882 may be formed by flexible poles 884, such as those used in lightweight tents. The flexible poles 884 are placed in the front pen portion 882 at periodic intervals to form the supporting structure of the front portion 882 of the pet pen. For example, sleeves may be formed in the material of the front pen portion 882 of the pet pen in which the poles 884 are inserted.

The front panel 804 may be formed to include or accommodate a thick, padded material such that when the front pen portion 882 is deployed and the front panel 804 rests on a flat surface, the front panel 804 provides a comfortable surface for the pet to be on. The inside of the front panel 804 may comprise a coating, such as a polyurethane coating to provide a waterproof barrier.

When the rear pen release zipper 880 is unzipped, at least a portion of the rear panel 802 folds away from the side panels 803 deploying a rear pen portion 883 of the pet pen. The rear pen portion 883 may be formed from a mesh material that allows the pet to see out and provides ventilation to the rear pen portion 883 while being sufficiently strong to retain the pet within the front portion 882 of the pet pen. The structure of the rear pen portion 883 may be formed by flexible poles 885, such as those used in lightweight tents. The flexible poles 885 are placed in the rear pen portion 883 at periodic intervals to form the supporting structure of the rear pen portion 883 of the pet pen. For example, sleeves may be formed in the material of the rear pen portion 883 of the pet pen in which the poles 885 are inserted.

The rear panel 802 may be formed to include or accommodate a thick, padded material such that when the rear pen portion 883 is deployed and the rear panel 802 rests on a flat surface, the rear panel 802 provides a comfortable surface for the pet to be on. The inside of the rear panel 802 may comprise a coating, such as a polyurethane coating to provide a waterproof barrier.

Figure 9:
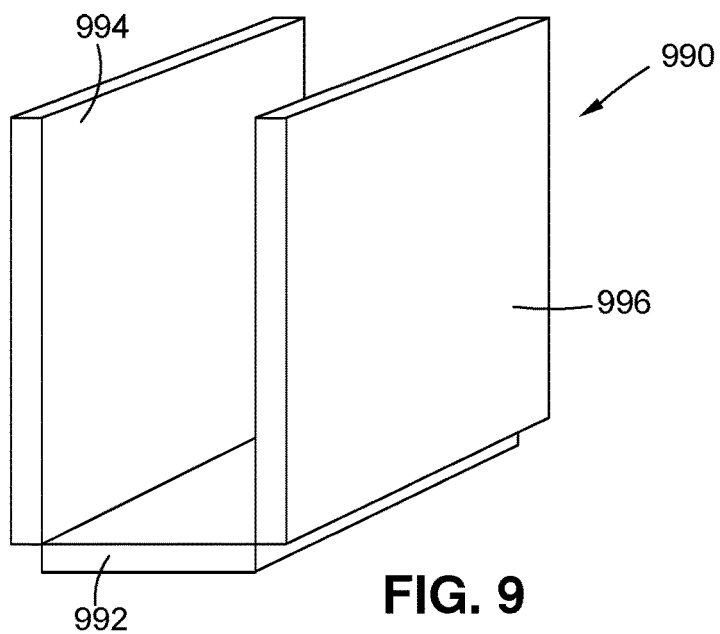
FIG. 9 shows a base padding for a convertible pet backpack and pen, according to one exemplary embodiment.

FIG. 9 shows a base padding for a convertible pet backpack and pen, according to one exemplary embodiment. A base padding 990 may include a bottom portion 992, a first side portion 994, and a second side portion 996. The base padding 990 may be formed from any suitable material to provide support and padding for a pet. The base padding 990 is configured to be disposed in the bottom panel 805, front panel 802, and rear panel 804 of the backpack 800 (see FIGS. 8A-8D). When the front and rear pen portions 882, 883 of the pet pen are deployed, the side panels 994, 996 fold down flat adjacent to the bottom panel 992 to form a comfortable pad on which a pet may rest. The size and shape of the panels 992, 994, 996 may vary based on the size and shape of the bottom panel 805 of the backpack 800 and the portions of the front and rear panels 802, 804 which deploy as the pet pen.

The backpack 800 provides several benefits to the user. The user may carry a pet similar to backpacks 100, 300, 400 while also providing a safe comfortable enclosure for the pet upon arrival to a destination. The pet pen keeps the pet safe and secure while allowing the user to remove the backpack 800 so that the user does not have to constantly wear the carrier. Further, the pet can securely remain in the pet carrier at the destination while having the freedom to rest comfortably in a sitting or lying down position within the deployed pet pen.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A pet carrying backpack comprising:
   a bottom panel, a front panel, a rear panel, a right-side panel, and a left-side panel connected together to form a bag with an open top, the open top comprising a collar forming an opening which is configured to allow a head of an animal disposed within the bag to protrude therefrom, the collar being adjustable;
   shoulder straps disposed on and extending from the front panel;
   paw holes disposed on a front of the bag above the shoulder straps and below the collar, the paw holes being configured to accommodate paws or legs of the animal;
   a pet carrying platform disposed within the bag above the bottom panel and below the open top, the pet carrying platform forming a storage compartment below the pet carrying platform and a pet compartment above the pet carrying platform.

2. The pet carrying backpack of claim 1, further comprising at least one contouring strap that is configured to shape the bag.

3. The pet carrying backpack of claim 2, further comprising a vertical zipper disposed in the back panel, the zipper facilitating ingress and egress to and from the pet compartment, wherein the at least one contouring strap comprises at least one lumbar support strap that is disposed on the backpack to cross over the vertical zipper.

4. The pet carrying backpack of claim 3, wherein the at least one lumbar support strap extends across the rear panel and attaches to the backpack at seams between the rear panel and the side panels.

5. The pet carrying backpack of claim 2, wherein the at least one contouring strap comprises at least one adjustment strap disposed over at least one of the right-side panel and the left-side panel, the at least one adjustment strap being oriented diagonally relative to a seam between the front panel and the at least one of the right-side panel and the left-side panel.

6. The pet carrying backpack of claim 5, wherein an angle of the diagonal orientation of the at least one adjustment strap is between 25 degrees and 65 degrees.

7. The pet carrying backpack of claim 1, wherein the pet carrying platform is angled upwards from the front panel towards the rear panel.

8. The pet carrying backpack of claim 7, wherein an angle of the pet carrying platform relative to a direction perpendicular to the front panel is between 10 and 30 degrees.

9. The pet carrying backpack of claim 1, further comprising waist straps, the waist straps being connected to the bag adjacent to the storage compartment.

10. A set of pet carrying backpacks, each of the pet carrying backpacks being a pet carrying backpack according to claim 1, wherein a first pet carrying platform of a first pet carrying backpack of the set of pet carrying backpacks is disposed at a first distance from a first bottom panel of the first pet carrying backpack and a second pet carrying platform of a second pet carrying backpack of the set of pet carrying backpacks is disposed at a second distance from a second bottom panel of the second pet carrying backpack, the second distance being greater than the first distance.

\* \* \* \* \*